G. D. JENSSEN.
MEANS FOR MAKING SULFITE ACID LIQUOR AND THE LIKE.
APPLICATION FILED MAR. 24, 1917.
1,251,533.
Patented Jan. 1, 1918.
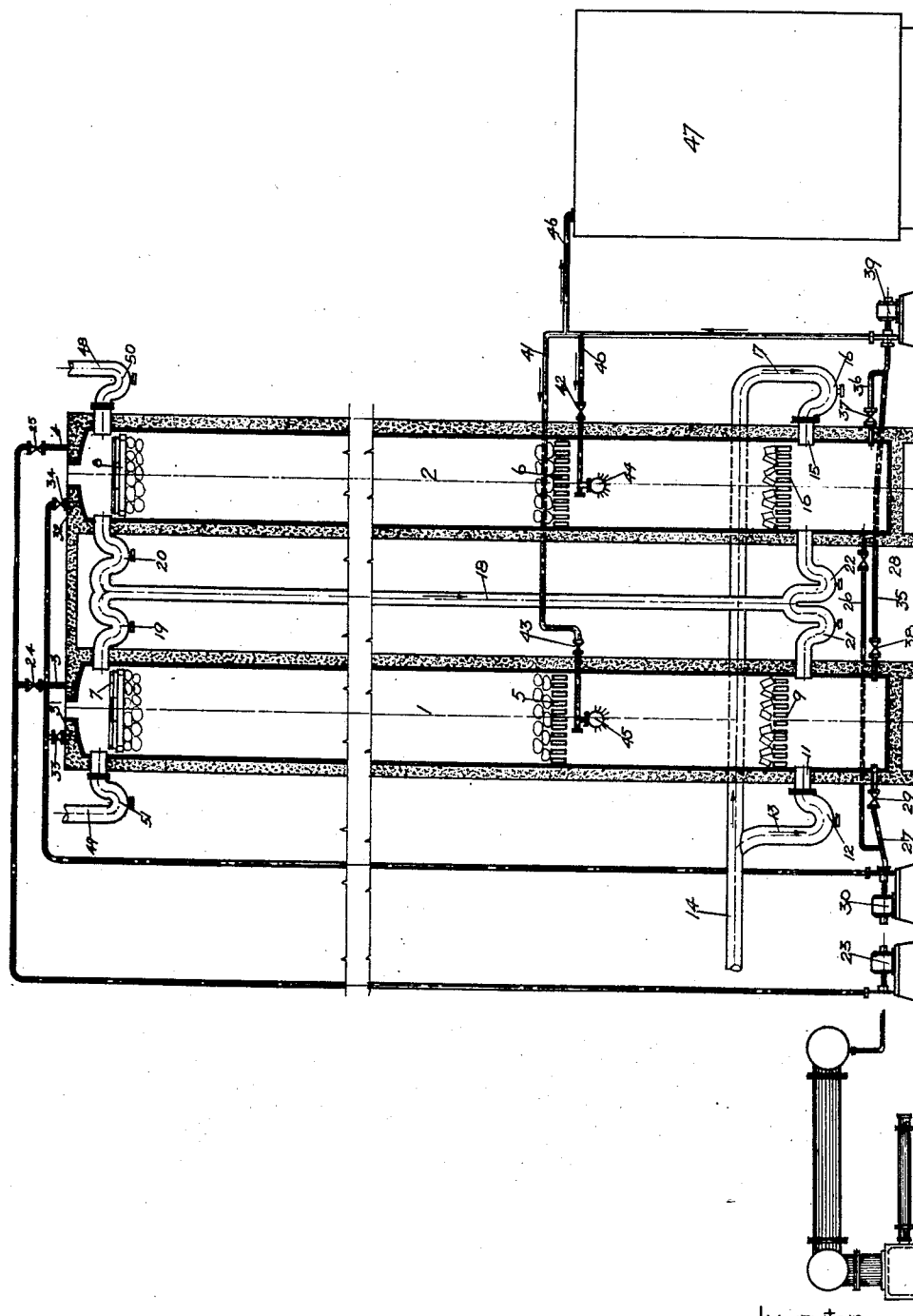
WITNESSES
V. Fetherstonhaugh
V. I. Fetherstonhaugh
By
INVENTOR
G. D. Jenssen
E. J. Fetherstonhaugh
Attorney

UNITED STATES PATENT OFFICE.

GUNNAR DARRE JENSSEN, OF NEW YORK, N. Y.

MEANS FOR MAKING SULFITE ACID LIQUOR AND THE LIKE.

1,251,533. Specification of Letters Patent. Patented Jan. 1, 1918.

Application filed March 24, 1917. Serial No. 157,225.

*To all whom it may concern:*

Be it known that I, GUNNAR DARRE JENSSEN, a subject of the King of Norway, and resident of 200 Fifth avenue, in the city of New York, in the State of New York, in the United States of America, have invented new and useful Improvements in Means for Making Sulfite Acid Liquor and the like, of which the following is a specification.

The invention relates to means for making sulfite acid liquor and the like, as described in the present specification and shown in the accompanying drawings that form part of the same.

The invention consists essentially of the novel construction and arrangement of parts, whereby the function of the absorption towers may be changed at will without affecting the efficiency of the operation, and the quality of the liquor is maintained.

In the production of acid liquor by absorption of the sulfur dioxid, it has always been necessary in the past practice of this art to shut down the towers for washing purposes and the objects of this invention are to eliminate this necessity and thereby increase the capacity of a plant and effect economy in regard to labor, to enable the charging of a tower with the required contents during the operations, to insure the quality of the product, to regulate the percentage of free sulfur dioxid in the finished acid liquor and generally to provide a plant for the purposes of gas absorption processes and such like, in which the continuous operation need not be interrupted in the ordinary course of events.

The drawing shows a vertical sectional plan view of the various parts.

Referring to the drawing, the plant is here shown with two towers 1 and 2, though the invention is not limited to any particular number, so long as the salient features are included. One or other of the towers 1 and 2 is fed with water at the upper end through the inlet pipes 3 and 4. A quantity of limestone in pieces, customarily used in such processes, is supported in the tower 1 on the upper grate 5 and in the tower 2 on the upper grate 6 and above the limestone in the tower 1 the spray box 7 is situated and similarly in the tower 2 the spray box 8. The lower grates 9 and 10 are situated in the towers 1 and 2, respectively a reasonable distance above the bottom and spaced from the grates 5 and 6, and the said grates 9 and 10 support blocks of hard wood, tile rings or other insoluble material, which fill up the greater part of the space between the upper and lower grates.

The supply gas pipe 14 leads from the sulfur dioxid plant *a* and the said pipe 14 is connected to the inlet pipe 11, leading into the tower 1 below the grate 9, through the trap 12 by the pipe 13. The inlet pipe 15 below the grate 10 in the tower 2 is connected to the pipe 14 through the trap 16 by the pipe 17.

The gas feed pipe 18 between towers is connected to the upper end of the tower 1 by the outlet trap pipe 19 and to the upper end of the tower 2 by the outlet trap pipe 20, and to the lower part of the tower 1 just below the grate 9 by the inlet trap pipe 21 and to the lower part of the tower 2 below the grate 10 by the inlet trap pipe 22.

The water pump 23 forces water up the water supply pipe *b* to the inlet pipes 3 and 4, the feed to the towers 1 and 2 being controlled by the cut off valves 24 and 25 introduced in said inlet pipes 3 and 4.

The water trickles down through the limestone pieces on the lower grates and the blocks on the lower grate in the particular tower being fed with water and reaches the lower end of said tower and if that tower happens to be the tower 2, this weak acid liquor flows out through the pipe 26, and if the tower 1, through the pipe 27, the cut off valve 28 controlling the outlet through the pipe 26, and the cut off valve 29 controlling the outlet through the pipe 27.

The weak acid liquor thus delivered from a tower reaches the pump 30, and said pumps forces it up the pipe *c* to the inlet acid liquor pipes 31 and 32, these inlet pipes leading into the upper end of the towers 1 and 2 respectively and having the cut off valves 33 and 34 introduced thereinto and controlling the feed of acid liquor to said towers.

The strong acid liquor is discharged from the tower 1, if it happens to be used for that purpose, through the pipe 35 and from the tower 2, if the uses of the towers are reversed, by the pipe 36, the cut off valve 37 controlling the flow from the outlet pipe 36 leading from the lower end of the tower 2, and the cut off valve 38, controlling the flow from the outlet pipe 35 leading from the lower end of the tower 1.

The pipes 35 and 36 lead to the acid liquor pump 39 and this pump forces the strong acid liquor up the pipe $d$ to the pipe 40 or pipe 41, controlled by the cut off valves 42 and 43, respectively, and leading to the spray nozzles 44 and 45 respectively in the towers 1 and 2 and immediately under the grates 5 and 6. The pipe $d$ also leads to the pipe 46 and the latter to the acid storage tank 47, so by closing the valves 42 and 43 all the discharge from the strong acid liquor towers will go into said tank, but by opening one of said valves 42 or 43 a quantity of acid liquor will be returned for further absorption of gas, so that the strength of the acid liquor may be readily determined.

The vent pipe 48 for the escape of the spent gas is connected to the upper end of the tower 2, through the trap 50 and the vent pipe 49 is connected to the upper end of the tower 1 through the trap 51.

It may be said that the traps 12, 16, 19, 20, 21, 22, 50 and 51 are all constructed so as to be closable respectively, at will for cutting off inlets and outlets as desired.

Briefly the operation of the invention is as follows:—

In operating the system with the tower 1 as a strong acid liquor tower the traps 16, 20, 21 and 51 are closed, also the valves 24, 34, 37, 28 and 42, and the traps 12, 19, 22 and 50, are opened, also the valves 25, 33, 38, 43, 29.

The gas flows into the pipe 13, through the trap 12 and inlet pipe 11 to the tower 1 under the grate 9 and the said tower 1 thus becomes part of the communicating passage from the gas plant for the initial and following flow of gas to the tower 2; which is the primary tower in the process of producing the acid liquor. The gas reaching the tower 1 rises in said tower through the blocks on the grate 9 and through the limestone pieces on the grate 5 and flows out of said tower through the trap 19 into the pipe 18 and down said pipe and through the trap 22 into the tower 2 under the grate 10 and rises in said tower 2 through the blocks on the grate 10 and limestone pieces on the grate 6 meeting the water being fed into the tower through the inlet pipe 4 as the said water trickles through the limestone and blocks. The spent gas exhausts through the trap 50 and pipe 48, being during the continuation of the process used in the two towers previous to its escape to the atmosphere.

The weak acid liquor in the lower end of the primary tower is discharged through the pipe 26 to the acid liquor pump 30, from which it is forced up to the inlet pipe 31 and this weak acid liquor trickles down through the limestone pieces and blocks in the tower 1 and is met by the rising gas, which it largely absorbs, materially strengthening said acid liquor. The acid liquor flows out from the lower end of the tank 1 through the pipe 35 to the acid liquor pump 39, from which it is forced up to the pipes 41 and 46, a considerable quantity of the liquor flowing again into the tower 1 above the blocks and missing the limestone and thus apart from the latter absorbing the sulfur dioxid, so that the percentage of sulfur dioxid can be accurately gaged, this being regulated by the valve 43.

To reverse the functions of the towers, 1 becomes the weak acid liquor tower and 2 the strong acid liquor tower, therefore the traps 16, 20, 21 and 51 are opened, also the valves 24, 34, 37, 28 and 42, and the traps 12, 19, 22 and 50 are closed, also the valves 25, 33, 38, 43, 29. Now the water is fed into the tower 1, and 2 becomes a communicating gas passage to tower 1 in the initial and following flow of gas thereto.

The primary tower 1 receives its charge of gas from 2 which gas is absorbed by the trickling water and the weak acid liquor produced pumped into tower 2, from whence it flows to the acid pump 39 through the pipe 36 and from there it is pumped up to the pipes 40 and 46, the sulfur dioxid strength being regulated by the valve 42 as already explained hereinbefore.

It will now be seen that in this invention the process in certain parts follows out well known and practical knowledge in this art, but it also is a radical departure from common practice, as there is always an intervening tower between the sulfur dioxid plant and the primary tower and yet the towers may be reversed at will, thereby eliminating the necessity of shutting down the plant for washing the towers, as they are flushed regularly in use by the systematic change over of their functions. Then again each tower is provided with the means of regulating the percentage of sulfur dioxide, which may be used no matter how the towers are changed in regard to their functions and this is important both in the duplication of the parts and the novelty of the means employed to accomplish this important result.

It may be noted that another advantage in this system is the facility with which the towers may be charged with limestone during the operation, for being reversible any one tower can always be changed to or remain for the time being as the primary tower in the operation for this purpose.

It must be understood that without departing from the spirit of the invention, changes may be made in the construction of this plant for the specific use mentioned herein and for any other purpose to which it may be applied, so long as it remains within the scope of the claims for novelty following.

What I claim is:—

1. In an apparatus for making bisulfite liquor, a plurality of towers having suitable inlets and outlets and in the interior a material supported intermediate of their height from which an ingredient of the liquor is obtained and a material supported intermediate of the distance between the support of the aforesaid material and the lower ends solely for retarding the liquor in its downward course to the lower ends of said towers, a sulfur dioxid plant and pipes forming connections from said dioxid plant, between towers and to and from said inlets and outlets and controlled by valves, certain of said pipes being adapted to direct the acid liquor over said lower retarding material for retreatment.

2. In an apparatus for making bisulfite liquor, a plurality of towers, each having at the upper end a water inlet, a gas outlet, an acid liquor inlet and a gas vent controlled by valves, also at the lower end gas inlets and acid liquor outlets, and in the interior a lower grate supporting a quantity of pieces of material insoluble in acid liquor and an upper grate supporting a quantity of limestone in pieces and an inlet for the acid liquor below the upper grate or limestone pieces connected with one of said lower acid liquor outlets, a sulfur dioxid plant connected to each tower at one of the lower gas inlets, a water supply connected to each tower, a storage tank connected to a lower acid liquor outlet in each tower, and a pipe connecting the upper gas outlets to the lower gas inlets in each pair of towers.

3. In an apparatus for making bisulfite liquor, a pair of towers having two stages in grate form, one toward the bottom and the other intermediate of the distance to the top, the upper grate supporting limestone in pieces and the lower grate acid proof material in pieces, a sulfur dioxid plant communicating with both of said towers at the lower end, a water supply communicating with both of said towers at the upper end, a storage tank communicating with both of said towers at the lower end thereof, return pipes in the connections leading to said towers below said upper grates and adapted to convey the acid liquor for further treatment, gas vents from said towers and means for cutting off any one or group of said communications.

4. In an apparatus for making bisulfite liquor, a sulfur dioxid plant, a water pump, a transfer acid liquor pump, a discharge acid liquor pump, a main feed gas pipe leading from said gas plant, a pair of towers containing on a second stage limestone in pieces and on a lower stage blocks of acid proof material, a pair of inlet pipes communicating with said towers below said lower stage and connected to said main feed pipe through closable traps, a pair of inlet gas pipes communicating with said towers below said lower stage and connected through closable traps to a main gas transfer pipe, a pair of outlet gas pipes communicating with said towers at the upper end and connected with said transfer pipe at the upper end through closable traps, a pair of vent pipes connected with said towers at the upper end through closable traps, a pipe from said water pump connected to said towers at the upper end, valves in said water pipe, a pipe connecting the upper ends of said towers with said transfer acid liquor pump, valves in said acid liquor pipe, pipes connecting said towers at their lower ends to said transfer acid liquor pump, valves in said lower liquor pipes to the pump, discharge pipes from the lower ends of said towers to said discharge acid liquor pump, an elevating pipe from the latter pump, a storage tank connected to said elevating pipe, return pipes leading from said elevating pipe to said towers beneath the limestone stages, spray nozzles on the ends of aid return pipes, and valves in said return pipes.

Signed at New York City, N. Y. State, this 22nd day of December, 1916.

GUNNAR DARRE JENSSEN.

Witnesses:
 ROBERT A. NORRISS,
 W. FETHERSTONHAUGH.